United States Patent
Funk et al.

(10) Patent No.: US 7,681,000 B2
(45) Date of Patent: Mar. 16, 2010

(54) SYSTEM FOR PROTECTING SENSITIVE DATA FROM USER CODE IN REGISTER WINDOW ARCHITECTURE

(75) Inventors: David William Funk, Balmain (AU); Barry Gauke, Balmain (AU); Kia Silverbrook, Balmain (AU)

(73) Assignee: Silverbrook Research Pty Ltd, Balmain, New South Wales (AU)

(*) Notice: Subject to any disclaimer, the term of this patent is extended or adjusted under 35 U.S.C. 154(b) by 893 days.

(21) Appl. No.: 11/482,989

(22) Filed: Jul. 10, 2006

(65) Prior Publication Data

US 2008/0010425 A1 Jan. 10, 2008

(51) Int. Cl.
*G06F 12/00* (2006.01)
(52) U.S. Cl. .................. 711/163; 711/132; 726/27
(58) Field of Classification Search ................ 711/163, 711/132; 726/27
See application file for complete search history.

(56) References Cited

U.S. PATENT DOCUMENTS 5,684,948 A * 11/1997 Johnson et al. .............. 726/29
6,895,508 B1 * 5/2005 Swanberg et al. ............ 726/16
2004/0133802 A1 7/2004 Liu

FOREIGN PATENT DOCUMENTS

EP 1603039 A2 12/2005

OTHER PUBLICATIONS

SPARC International Inc., The SPARC Architecture Manual Version 8, 1992.

* cited by examiner

*Primary Examiner*—Pierre-Michel Bataille
*Assistant Examiner*—John P Fishburn

(57) ABSTRACT

A system for protecting supervisor mode data from user code in a register window architecture of a processor is provided. The system, when transitioning from supervisor mode to user mode, setting at least one invalid window bit in the invalid window mask of the architecture additional to the invalid window bit set for the reserved window of the invalid window mask. The additional bit is set for a transition window between supervisor and user data windows.

15 Claims, 3 Drawing Sheets

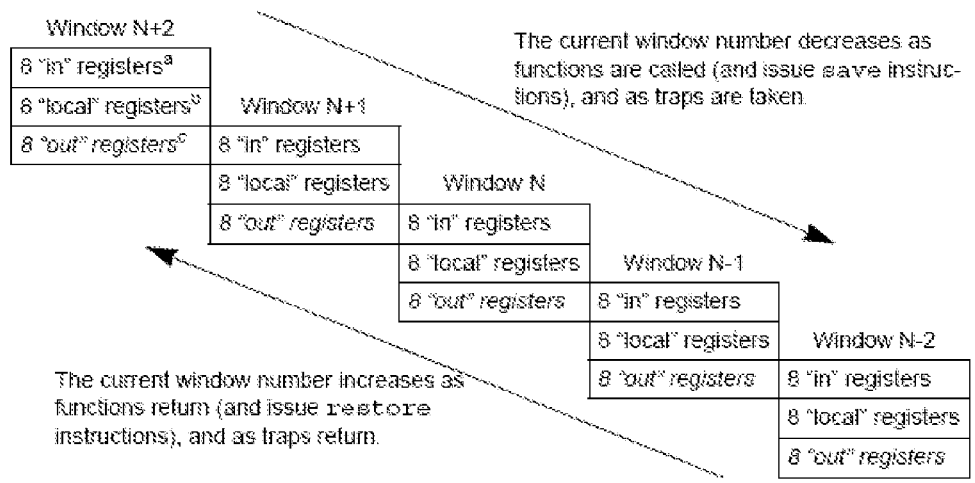

a: %i0 to %i7, 'i' = "in"; b: %l0 to %l7, 'l' = "local"; c: %o0 to %o7, 'o' = "out"

FIG. 3 (Related Art)

| Window: | 7 | 6 | 5 | 4 | 3 | 2 | 1 | 0 |
|---|---|---|---|---|---|---|---|---|
| Data: | S1 | S2 | U1 | U2 | U3 | X | X | R |
| Invalid window mask: | 0 | 0 | 0 | 0 | 0 | 0 | 0 | 1 |
| CWP just before calling user code: | | ↑ | | | | | | |
| CWP now: | | | | ↑ | | | | |

S = Supervisor data, U = User data, X = Not used, R = Window reserved for trap

FIG. 4 (Related Art)

| Window: | 7 | 6 | 5 | 4 | 3 | 2 | 1 | 0 |
|---|---|---|---|---|---|---|---|---|
| Data: | S1 | S2 | T | U1 | U2 | U3 | X | R |
| Invalid window mask: | 0 | 0 | 1 | 0 | 0 | 0 | 0 | 1 |
| CWP just before calling user code: | | | | ↑ | | | | |
| CWP now: | | | | | | ↑ | | |

S = Supervisor data, U = User data, X = Not used, T = Transition window, R = Window reserved for trap

FIG. 5

SYSTEM FOR PROTECTING SENSITIVE DATA FROM USER CODE IN REGISTER WINDOW ARCHITECTURE

FIELD OF THE INVENTION

This invention related to an electronic device having an embedded computer system. It has been developed primarily for improving security and protecting the computer system from malicious software tampering, whilst still allowing flexibility in software design downstream of the device manufacturer.

CO-PENDING APPLICATIONS

The following applications have been filed by the Applicant simultaneously with the present application:

| | | | | |
|---|---|---|---|---|
| 11/482,975 | 11/482,970 | 11/482,968 | 11/482,972 | 11/482,971 |
| 11/482,969 | 7,530,663 | 7,467,846 | 11/482,962 | 11/482,963 |
| 11/482,956 | 11/482,954 | 11/482,974 | 11/482,957 | 11/482,987 |
| 11/482,959 | 11/482,960 | 11/482,961 | 11/482,964 | 11/482,965 |
| 7,510,261 | 11/482,973 | 11/482,982 | 11/482,983 | 11/482,984 |
| 7,530,446 | 11/482,990 | 11/482,986 | 11/482,985 | 11/482,978 |
| 11/482,967 | 11/482,966 | 11/482,988 | 11/482,980 | 7,571,906 |
| 11/482,953 | 11/482,977 | | | |

The disclosures of these co-pending applications are incorporated herein by reference.

CROSS REFERENCES TO RELATED APPLICATIONS

Various methods, systems and apparatus relating to the present invention are disclosed in the following US Patents/Patent Applications filed by the applicant or assignee of the present invention:

| | | | | | | |
|---|---|---|---|---|---|---|
| 09/517,539 | 6,566,858 | 6,331,946 | 6,246,970 | 6,442,525 | 09/517,384 | 09/505,951 |
| 6,374,354 | 09/517,608 | 6,816,968 | 6,757,832 | 6,334,190 | 6,745,331 | 09/517,541 |
| 10/203,559 | 10/203,560 | 10/203,564 | 10/636,263 | 10/636,283 | 10/866,608 | 10/902,889 |
| 10/902,833 | 10/940,653 | 10/942858 | 10/727,181 | 10/727,162 | 10/727,163 | 10/727,245 |
| 10/727,204 | 10/727,233 | 10/727,280 | 10/727,157 | 10/727,178 | 10/727,210 | 10/727,257 |
| 10/727,238 | 10/727,251 | 10/727,159 | 10/727,180 | 10/727,179 | 10/727,192 | 10/727,274 |
| 10/727,164 | 10/727,161 | 10/727,198 | 10/727,158 | 10/754,536 | 10/754,938 | 10/727,227 |
| 10/727,160 | 10/934,720 | 11/212,702 | 11/272,491 | 10/296,522 | 6,795,215 | 10/296,535 |
| 09/575,109 | 6,805,419 | 6,859,289 | 6,977,751 | 6,398,332 | 6,394,573 | 6,622,923 |
| 6,747,760 | 6,921,144 | 10/884,881 | 10/943,941 | 10/949,294 | 11/039,866 | 11/123,011 |
| 6,986,560 | 7,008,033 | 11/148,237 | 11/248,435 | 11/248,426 | 10/922,846 | 10/922,845 |
| 10/854,521 | 10/854,522 | 10/854,488 | 10/854,487 | 10/854,503 | 10/854,504 | 10/854,509 |
| 10/854,510 | 10/854,496 | 10/854,497 | 10/854,495 | 10/854,498 | 10/854,511 | 10/854,512 |
| 10/854,525 | 10/854,526 | 10/854,516 | 10/854,508 | 10/854,507 | 10/854,515 | 10/854,506 |
| 10/854,505 | 10/854,493 | 10/854,494 | 10/854,489 | 10/854,490 | 10/854,492 | 10/854,491 |
| 10/854,528 | 10/854,523 | 10/854,527 | 10/854,524 | 10/854,520 | 10/854,514 | 10/854,519 |
| 10/854,513 | 10/854,499 | 10/854,501 | 10/854,500 | 10/854,502 | 10/854,518 | 10/854,517 |
| 10/934,628 | 11/212,823 | 10/728,804 | 10/728,952 | 10/728,806 | 6,991,322 | 10/728,790 |
| 10/728,884 | 10/728,970 | 10/728,784 | 10/728,783 | 10/728,925 | 6,962,402 | 10/728,803 |
| 10/728,780 | 10/728,779 | 10/773,189 | 10/773,204 | 10/773,198 | 10/773,199 | 6,830,318 |
| 10/773,201 | 10/773,191 | 10/773,183 | 10/773,195 | 10/773,196 | 10/773,186 | 10/773,200 |
| 10/773,185 | 10/773,192 | 10/773,197 | 10/773,203 | 10/773,187 | 10/773,202 | 10/773,188 |
| 10/773,194 | 10/773,193 | 10/773,184 | 11/008,118 | 11/060,751 | 11/060,805 | 11/188,017 |
| 11/298,773 | 11/298,774 | 11/329157 | 6,623,101 | 6,406,129 | 6,505,916 | 6,457,809 |
| 6,550,895 | 6,457,812 | 10/296,434 | 6,428,133 | 6,746,105 | 10/407,212 | 10/407,207 |
| 10/683,064 | 10/683,041 | 6,750,901 | 6,476,863 | 6,788,336 | 11/097,308 | 11/097,309 |
| 11/097,335 | 11/097,299 | 11/097,310 | 11/097,213 | 11/210,687 | 11/097,212 | 11/212,637 |
| 11/246,687 | 11/246,718 | 11/246,685 | 11/246,686 | 11/246,703 | 11/246,691 | 11/246,711 |
| 11/246,690 | 11/246,712 | 11/246,717 | 11/246,709 | 11/246,700 | 11/246,701 | 11/246,702 |
| 11/246,668 | 11/246,697 | 11/246,698 | 11/246,699 | 11/246,675 | 11/246,674 | 11/246,667 |
| 11/246,684 | 11/246,672 | 11/246,673 | 11/246,683 | 11/246,682 | 10/760,272 | 10/760,273 |
| 10/760,187 | 10/760,182 | 10/760,188 | 10/760,218 | 10/760,217 | 10/760,216 | 10/760,233 |
| 10/760,246 | 10/760,212 | 10/760,243 | 10/760,201 | 10/760,185 | 10/760,253 | 10/760,255 |
| 10/760,209 | 10/760,208 | 10/760,194 | 10/760,238 | 10/760,234 | 10/760,235 | 10/760,183 |
| 10/760,189 | 10/760,262 | 10/760,232 | 10/760,231 | 10/760,200 | 10/760,190 | 10/760,191 |
| 10/760,227 | 10/760,207 | 10/760,181 | 10/815,625 | 10/815,624 | 10/815,628 | 10/913,375 |
| 10/913,373 | 10/913,374 | 10/913,372 | 10/913,377 | 10/913,378 | 10/913,380 | 10/913,379 |
| 10/913,376 | 10/913,381 | 10/986,402 | 11/172,816 | 11/172,815 | 11/172,814 | 11/003,786 |
| 11/003,616 | 11/003,418 | 11/003,334 | 11/003,600 | 11/003,404 | 11/003,419 | 11/003,700 |
| 11/003,601 | 11/003,618 | 11/003,615 | 11/003,337 | 11/003,698 | 11/003,420 | 6,984,017 |
| 11/003,699 | 11/071,473 | 11/003,463 | 11/003,701 | 11/003,683 | 11/003,614 | 11/003,702 |
| 11/003,684 | 11/003,619 | 11/003,617 | 11/293,800 | 11/293,802 | 11/293,801 | 11/293,808 |
| 11/293,809 | 11/246,676 | 11/246,677 | 11/246,678 | 11/246,679 | 11/246,680 | 11/246,681 |
| 11/246,714 | 11/246,713 | 11/246,689 | 11/246,671 | 11/246,670 | 11/246,669 | 11/246,704 |
| 11/246,710 | 11/246,688 | 11/246,716 | 11/246,715 | 11/246,707 | 11/246,706 | 11/246,705 |
| 11/246,708 | 11/246,693 | 11/246,692 | 11/246,696 | 11/246,695 | 11/246,694 | 11/293,832 |
| 11/293,838 | 11/293,825 | 11/293,841 | 11/293,799 | 11/293,796 | 11/293,797 | 11/293,798 |
| 10/760,254 | 10/760,210 | 10/760,202 | 10/760,197 | 10/760,198 | 10/760,249 | 10/760,263 |
| 10/760,196 | 10/760,247 | 10/760,223 | 10/760,264 | 10/760,244 | 10/760,245 | 10/760,222 |
| 10/760,248 | 10/760,236 | 10/760,192 | 10/760,203 | 10/760,204 | 10/760,205 | 10/760,206 |
| 10/760,267 | 10/760,270 | 10/760,259 | 10/760,271 | 10/760,275 | 10/760,274 | 10/760,268 |

-continued

| | | | | | | |
|---|---|---|---|---|---|---|
| 10/760,184 | 10/760,195 | 10/760,186 | 10/760,261 | 10/760,258 | 11/293,804 | 11/293,840 |
| 11/293,803 | 11/293,833 | 11/293,834 | 11/293,835 | 11/293,836 | 11/293,837 | 11/293,792 |
| 11/293,794 | 11/293,839 | 11/293,826 | 11/293,829 | 11/293,830 | 11/293,827 | 11/293,828 |
| 11/293,795 | 11/293,823 | 11/293,824 | 11/293,831 | 11/293,815 | 11/293,819 | 11/293,818 |
| 11/293,817 | 11/293,816 | 11/014,764 | 11/014,763 | 11/014,748 | 11/014,747 | 11/014,761 |
| 11/014,760 | 11/014,757 | 11/014,714 | 11/014,713 | 11/014,762 | 11/014,724 | 11/014,723 |
| 11/014,756 | 11/014,736 | 11/014,759 | 11/014,758 | 11/014,725 | 11/014,739 | 11/014,738 |
| 11/014,737 | 11/014,726 | 11/014,745 | 11/014,712 | 11/014,715 | 11/014,751 | 11/014,735 |
| 11/014,734 | 11/014,719 | 11/014,750 | 11/014,749 | 11/014,746 | 11/014,769 | 11/014,729 |
| 11/014,743 | 11/014,733 | 11/014,754 | 11/014,755 | 11/014,765 | 11/014,766 | 11/014,740 |
| 11/014,720 | 11/014,753 | 11/014,752 | 11/014,744 | 11/014,741 | 11/014,768 | 11/014,767 |
| 11/014,718 | 11/014,717 | 11/014,716 | 11/014,732 | 11/014,742 | 11/097,268 | 11/097,185 |
| 11/097,184 | 11/293,820 | 11/293,813 | 11/293,822 | 11/293,812 | 11/293,821 | 11/293,814 |
| 11/293,793 | 11/293,842 | 11/293,811 | 11/293,807 | 11/293,806 | 11/293,805 | 11/293,810 |
| 09/575,197 | 09/575,195 | 09/575,159 | 09/575,123 | 6,825,945 | 09/575,165 | 6,813,039 |
| 6,987,506 | 09/575,131 | 6,980,318 | 6,816,274 | 09/575,139 | 09/575,186 | 6,681,045 |
| 6,728,000 | 09/575,145 | 09/575,192 | 09/575,181 | 09/575,193 | 09/575,183 | 6,789,194 |
| 6,789,191 | 6,644,642 | 6,502,614 | 6,622,999 | 6,669,385 | 6,549,935 | 09/575,187 |
| 6,727,996 | 6,591,884 | 6,439,706 | 6,760,119 | 09/575,198 | 6,290,349 | 6,428,155 |
| 6,785,016 | 09/575,174 | 09/575,163 | 6,737,591 | 09/575,154 | 09/575,129 | 6,830,196 |
| 6,832,717 | 6,957,768 | 09/575,162 | 09/575,172 | 09/575,170 | 09/575,171 | 09/575,161 |

The disclosures of these applications and patents are incorporated herein by reference.

BACKGROUND OF THE INVENTION

Electronic devices having embedded computer systems are now part of everyday life. Examples of such devices include automatic teller machines (ATMs), mobile telephones, printers, photocopiers, handheld calculators, microwave ovens, televisions, DVD players, washing machines, handheld game consoles etc. Broadly speaking, embedded computer systems are characterized by providing a function (or functions) that is not itself a computer.

Generally, an embedded system contains special-purpose hardware and a processor (CPU) supporting a real-time operating system (RTOS). The system is programmed with special-purpose software tailored to meet the requirements for that particular system. Typically, software written for an embedded system is referred to as 'firmware'. Since electronic devices are expected to run continuously for many years without errors, firmware is usually developed and tested more rigorously than software for computers.

Aside from the obvious operational advantages of an embedded computer system, there is a considerable advantage offered in terms of the manufacture and distribution of various product lines. When a new product is released onto the market, it is often desirable to release the product in different versions, each version having a price commensurate with that particular version. For example, a first product may have Feature X, while a second product may have Features X, Y and Z.

In terms of manufacturing, it is relatively expensive to have one production line dedicated to a first product and another production line dedicated to a second product. It is cheaper to manufacture a single product type that includes the necessary hardware for supporting Features X, Y and Z in all products. In this scenario, various product lines may be differentiated via their embedded firmware. The firmware provides a much cheaper means for differentiating between a range of products, compared to the hardware. Moreover, the firmware allows users to upgrade their devices without having to buy a new device. For example, an authorized Internet download via a personal computer may be used to provide an upgrade, which enables Features Y and Z in a product purchased originally with only Feature X.

However, an inherent problem with embedded firmware is that it is susceptible to malicious attack from hackers or willful copyright infringers offering unauthorized firmware upgrades. For example, an unauthorized firmware upgrade may be freely distributed over the Internet, allowing users to upgrade their devices free of charge.

One way of circumventing this problem is to provide upgrades not via the firmware itself, but via an authentication chip in the device. The use of an authentication chip ('QA chip') in a printer environment was described in our earlier applications listed below, the contents of which are herein incorporated by reference:

| | | | | | | |
|---|---|---|---|---|---|---|
| 10/727,251 | 10/727,159 | 10/727,180 | 10/727,179 | 10/727,192 | 10/727,274 | 10/727,164 |
| 10/727,161 | 10/727,198 | 10/727,158 | 10/754,536 | 10/754,938 | 10/727,227 | 10/727,160 |
| 10/296,522 | 6,795,215 | 10/296,535 | 09/575,109 | 6,805,419 | 6,859,289 | 6,977,751 |
| 6,398,332 | 6,394,573 | 6,622,923 | 6,747,760 | 6,921,144 | 10/884,881 | 10/943,941 |
| 10/949,294 | 11/039,866 | 11/123,011 | 6,986,560 | 7,008,033 | 11/148,237 | 11/248,435 |
| 11/248,426 | 11/298,630 | 09/517,539 | 6,566,858 | 6,331,946 | 6,246,970 | 6,442,525 |
| 09/517,384 | 09/505,951 | 6,374,354 | 09/517,608 | 09/505,147 | 6,757,832 | 6,334,190 |
| 6,745,331 | 09/517,541 | 10/203,560 | 10/203,564 | 10/636,263 | 10/636,283 |
| 10/866,608 | 10/902,889 | 10/902,833 | 10/940,653 | 10/942,858 | 10/854,514 | 10/854,519 |
| 10/854,513 | 10/854,499 | 10/854,501 | 10/854,500 | 10/854,502 | 10/854,518 | 10/854,517 |

As described in our earlier applications, QA chip(s) in a printer perform an array of functions in a secure environment. A QA chip in a print cartridge may be used to allow operation of the printer only in a licensed manner. For example, a printer A may be licensed to print at 10 pages per minute, while a printer B may be licensed to print at 30 pages per minute. The hardware in each printer is identical, but the QA chip allows each printer to be differentiated. Moreover, since the QA chip stores its data in a secure, authenticated fashion, it can only be upgraded or replaced by an authentic source. Hence, the QA chip provides protection against attack from unlicensed users.

A QA chip mounted on an ink cartridge may be used to guarantee that the ink contained in the cartridge is from a particular source or of a particular quality, thereby ensuring that incorrect ink, which may damage the printhead, cannot be used. The same QA chip may similarly be used to store dynamically in its memory a quantity of 'virtual ink' remaining in the cartridge, determined with reference to the initial quantity of ink in the cartridge and the number of dots printed using that ink. The quantity of 'virtual ink' provides a security mechanism for the printer and prevents unauthorized refilling of ink cartridges—the firmware in the printer communicates with the ink cartridge QA chip before printing and if the amount of 'virtual ink' is insufficient, the printer will not print. In this way, the quality of ink can be assured and risk of damaging the printhead using low quality ink from an unauthorized refill is minimized.

QA chips provide an excellent means for preventing unauthorized uses of electronic devices. However, the security of QA chips relies on firmware in the embedded system communicating with the chip. It is conceivable that the most determined hacker may be able to modify the firmware and override its communication with QA chip(s) in the device. In this scenario, the security provided by the QA chip would be compromised. In the above example, unauthorized refills of ink cartridges would be possible, irrespective of the presence of a QA chip on the ink cartridge.

It may seem unlikely that such a determined attack on an embedded computer system would be made. However, in the printer market, sales of unauthorized ink refills is becoming a multimillion dollar industry and provides considerable motivation for a malicious attack on any security systems built in to a printer. From the point of view of a printer manufacturer, the use of low quality ink in its printers, resulting in poor print quality and shortened printhead lifetime, has the potential to do incalculable damage to its goodwill and reputation in the printer market.

It would therefore be desirable to provide an electronic device, having an embedded computer system, with improved security from malicious attack.

It would further be desirable to provide such an electronic device, which still allows flexibility for firmware upgrades or even installation of an alternative core RTOS downstream of the device manufacturer.

It would further be desirable to provide a simple means for upgrading firmware in PictBridge printers.

SUMMARY OF THE INVENTION

In a first aspect, there is provided an electronic device comprising an embedded computer system, said device comprising a processor supporting a real-time operating system (RTOS), said processor supporting user and supervisor modes, wherein said computer system is programmed such that only code portions directly controlling essential hardware in said device are run in supervisor mode.

As used herein, "essential hardware" is used to mean hardware component(s) which are essential for the device to perform its primary function. For example, in the case of a printer, the essential hardware may include drive circuitry for actuating nozzle actuators in a printhead, but does not include an LCD display on the printer, since an LCD display is not essential for the printer to be able to print.

As used herein, the term "code portion" is used to mean any portion of code which performs a specific function. A code portion may be part of a thread or a process.

Processors supporting user and supervisor modes are well known in the computer art. Code running in supervisor mode can only be accessed by a person with special privileges, such as the person who wrote the code originally. By contrast, code running in user mode can be accessed and modified by any person, irrespective of their privileges.

An example of a processor, which supports user and supervisor modes, is the SPARC™ processor. Such processors were designed to protect a core (or kernel) of an operating system from potentially buggy applications running on a computer. With the core of the operating system running in supervisor mode, the operating system can continue to run, even if a particular application running in user mode has crashed. This ensures that other applications running in user mode can continue running on the operating system. By protecting the core of the operating system in this way, the risk of crashing the whole computer with a buggy application is minimized—there is a separation between applications and the core of the operating system.

In the present invention, the processor supporting user and supervisor modes is employed in a different manner from its conventional use in non-embedded computer systems. The embedded computer system of the present invention is programmed so that only code portions directly controlling essential hardware in the device are run in supervisor mode, with the remainder of code portions being run in user mode.

A major advantage of running certain code portions (which control essential hardware in the device) in supervisor mode is that these code portions cannot be modified once they have been finalized by the device manufacturer. Hence, the manufacturer, or a licensee, retains ultimate control over how the device may be operated.

For example, a printer manufacturer may program into code portions directly controlling a printhead and paper feed mechanism that the printer should only print at 10 pages per minute. Since this code portion is protected in supervisor mode, it is not possible for a hacker to modify the code and upgrade his printer.

Optionally, the computer system is programmed such that code portions not directly controlling essential hardware in said device are run in user mode. Optionally, a core of the RTOS is run in user mode. The advantages of programming the embedded computer system in this way are twofold. Firstly, the amount of code in supervisor mode is kept to a minimum, which minimizes the risk of bugs being present in this immutable code. Secondly, by having the RTOS and non-essential applications running in user mode, there is an opportunity for a licensed printer manufacturer or distributor, downstream of the original printer manufacturer, to develop its own firmware specific to its requirements on an operating system of its choice. For example, a licensed printer manufacturer may wish to change the format of an LCD display and he may wish to program this using his preferred operating system. In accordance with the present invention, a licensed printer manufacturer has the flexibility to do this, without the security of a QA system in the device being compromised.

Optionally, the computer system is programmed such that a code portion directly controlling essential hardware is callable from an application running in user mode via a trap identifying that code portion. A plurality of code portions, each directly controlling respective essential hardware, may each be independently callable from an application running in user mode via a respective trap identifying a respective code portion.

An advantage of being able to call up a particular code portion from user mode is that it provides further flexibility for programming specific operation sequences into the device. User mode applications may be programmed by a licensed device manufacturer or may even be available via an upgrade, downloadable from the Internet. For example, a printer user may wish to have a default option of printing '5000 pages, full color'. He is able to upgrade his firmware to have this default option, because the print job application(s) programmed into the embedded system run in user mode.

Optionally, the code portion directly controlling essential hardware communicates with at least one authentication chip in the device before an operation of the hardware. The authentication chip (or 'QA chip') authorizes the operation. For example, the code portion may ask the QA chip for the authorized print speed for that printer. The QA chip returns this information (e.g. 10 pages per minute) to the computer system and printing at the authorized print speed can commence. In this way, licensed operation of the device can be controlled securely via the QA chip, without being compromised by a malicious attack on firmware in the device.

Optionally, a first authentication chip is associated with a consumable component of said device. Examples of consumable components in electronic devices include ink cartridges, toner, paper, batteries etc. The first authentication chip may contain static and/or dynamic data relating to the consumable component. For example, static data may relate to a source, batch number, quality (e.g. ink color), initial quantity etc. of the consumable component. Dynamic data may relate to a current quantity (e.g. amount of remaining ink) or quality (e.g. temperature) of the consumable component.

An electronic device may require several consumable components. Accordingly, the device may comprise a plurality of first authentication chips, each one of the first authentication chips being associated with a respective consumable component.

Optionally, the electronic device is a printer and the consumable component is an ink cartridge having a respective first authentication chip. The authentication chip on an ink cartridge may be used to authorize printing only if certain conditions have been met e.g. (i) printing only when an ink cartridge of a predetermined type, as determined via the associated authentication chip, is loaded in the printer; and/or (ii) printing only when a predetermined amount of ink, as determined via the associated authentication chip, is remaining in the ink cartridge. As described earlier, these authentication mechanisms provide a printer manufacturer with assurances regarding the quality of ink used in its printers, thereby preserving the manufacturer's reputation in the printer market.

Optionally, a second authentication chip is positioned in a body of the device, which is not associated with a consumable component. For example, a second authentication chip may be mounted in or on a print engine for a printer. The second authentication chip may be used to authorize certain operations of the device, such as printing at a predetermined speed.

In a second aspect, there is provided a system for upgrading firmware in a PictBridge printer, the system comprising:

a PictBridge printer having an embedded computer system; and a memory stick for communicating with said embedded computer system, wherein said memory stick contains a firmware upgrade for said embedded computer system.

In a third aspect, there is provided a memory stick containing a firmware upgrade for an embedded computer system of a PictBridge printer.

In a fourth aspect, there is provided a system for upgrading firmware in a PictBridge printer, the system comprising:

a PictBridge printer having an embedded computer system; and a digital camera for communicating with said embedded computer system, wherein said camera contains a firmware upgrade for said embedded computer system.

In a fifth aspect, there is provided a digital camera containing a firmware upgrade for an embedded computer system of a PictBridge printer.

PictBridge is an industry open standard from the Camera & Imaging Products Association (CIPA) for direct printing. It allows images to be printed directly from digital cameras to a printer, without having to connect the camera to a computer. By connecting a PictBridge-enabled printer to a PictBridge-enabled camera using a single USB cable, users can easily control print settings using their camera and produce high quality photos without using a PC. A major advantage of PictBridge printing is its simplicity for the user, and especially those users for whom complex photo application software may be a barrier.

PictBridge relies on communication between embedded computer systems in the camera and printer. These embedded computer systems effectively replace PC photo applications and, moreover, simplify operability for the user.

From time to time, it may be necessary to upgrade firmware in a PictBridge printer. For example, additional printing options may be required or it may be necessary to upgrade firmware so that it is compatible with new PictBridge-enabled cameras on the market.

In traditional digital camera systems, software upgrades for PC photo applications are provided via internet downloads or CD. However, many PictBridge printer users may not own a computer in the first place. For those that do own a computer, the complexity of downloading new software onto their PC from the internet and upgrading their PictBridge printer by connecting it to their PC is likely to be a significant barrier. After all, PictBridge users are generally attracted to this system, because of its simplicity and because it obviates the need for a PC.

A major advantage of the present invention is its simplicity for the user. Insertion of a memory stick into a USB port of a PictBridge printer requires no computer skills. Therefore, firmware upgrades of a printer may be confidently performed by anyone without risk or fear of upgrading the printer incorrectly.

As used herein, the term "memory stick" is used to mean any portable non-volatile digital memory device.

The memory stick or camera may communicate with the embedded computer system via standard USB connectors.

Optionally, the memory stick or camera is configured to download automatically a firmware upgrade to the printer if it detects that the printer does not already have that upgrade.

Optionally, the portable non-volatile digital memory device is a memory stick.

The camera may be sold with the firmware upgrade already programmed into its memory. Alternatively, the camera may receive the firmware upgrade from an external source. For example, a memory stick may be used to download the firmware upgrade to the camera so that the camera can upgrade the printer when it is next connected.

In a sixth aspect, there is provided a system for protecting supervisor mode data from user code in a register window architecture of a processor, such as the processor of the first aspect, the system comprising, when transitioning from supervisor mode to user mode, setting at least one invalid window bit in the invalid window mask of the architecture additional to the invalid window bit set for the reserved window of the invalid window mask, the additional bit being set for a transition window between supervisor and user data windows.

The position of the additional invalid window bit in the invalid window mask is maintained independent of window overflows and underflows at the transition window.

Separate supervisor mode and user mode stacks may be provided, where the separate supervisor mode and user mode stacks are respectively stored in supervisor mode-only and user mode accessible memory.

The current stack pointer may be switched to between the supervisor and user stacks whenever a transition from user mode to supervisor mode and from supervisor mode to user mode occurs.

Optionally, information on the transition window is recorded in the supervisor stack upon window overflow and underflow at the transition window.

Optionally, a window stack is stored in the supervisor mode-only accessible memory, with the information on the transition window being recorded in the window stack upon window overflow and underflow at the transition window.

Optionally, information on non-transition windows is recorded in the window stack upon window overflow and underflow at the non-transition windows.

Optionally, a unique numerical label is assigned to each register window starting from zero and increasing monotonically for every save. A record of the current label assigned to the reserved window may be held in the local registers of the reserved window, with the record being updated as window overflows and underflows occur at the reserved window. The labels may be calculated based on the current window pointer.

Optionally, the labels are used to index a record of at least the stack pointer of the reserved window in the window stack upon window overflow and underflow at the reserved window.

Optionally, the labels are used to index a record of the stack pointers of each window in the window stack upon window overflow and underflow at each window.

When transitioning from supervisor code to user code, the call function may issue saves to bring the current window pointer to the user window positioned after the transition window and overwrite the registers in at least the windows containing supervisor code data from the current window to the reserved window.

The call function may overwrite the registers in all of the windows from the current window to the reserved window or all the registers of the processor containing supervisor code data. The registers in the transition window may be overwritten upon window overflow and underflow at the transition window.

When transitioning from user code to supervisor code, the window underflow trap routine may issue restores to bring the current window pointer to the supervisor window preceding the transition window.

BRIEF DESCRIPTION OF THE DRAWINGS

A specific embodiment of the invention will now be described in detail, with reference to the following drawings in which:

FIG. 3 illustrates a register window architecture implemented by a processor of the embedded computer system;

FIG. 4 illustrates a mode switch between supervisor and user modes; and

FIG. 5 illustrates a mode switch between supervisor and user modes employing a transition window.

DETAILED DESCRIPTION OF SPECIFIC EMBODIMENT

Embedded System with User and Supervisor Modes

Figure 1:
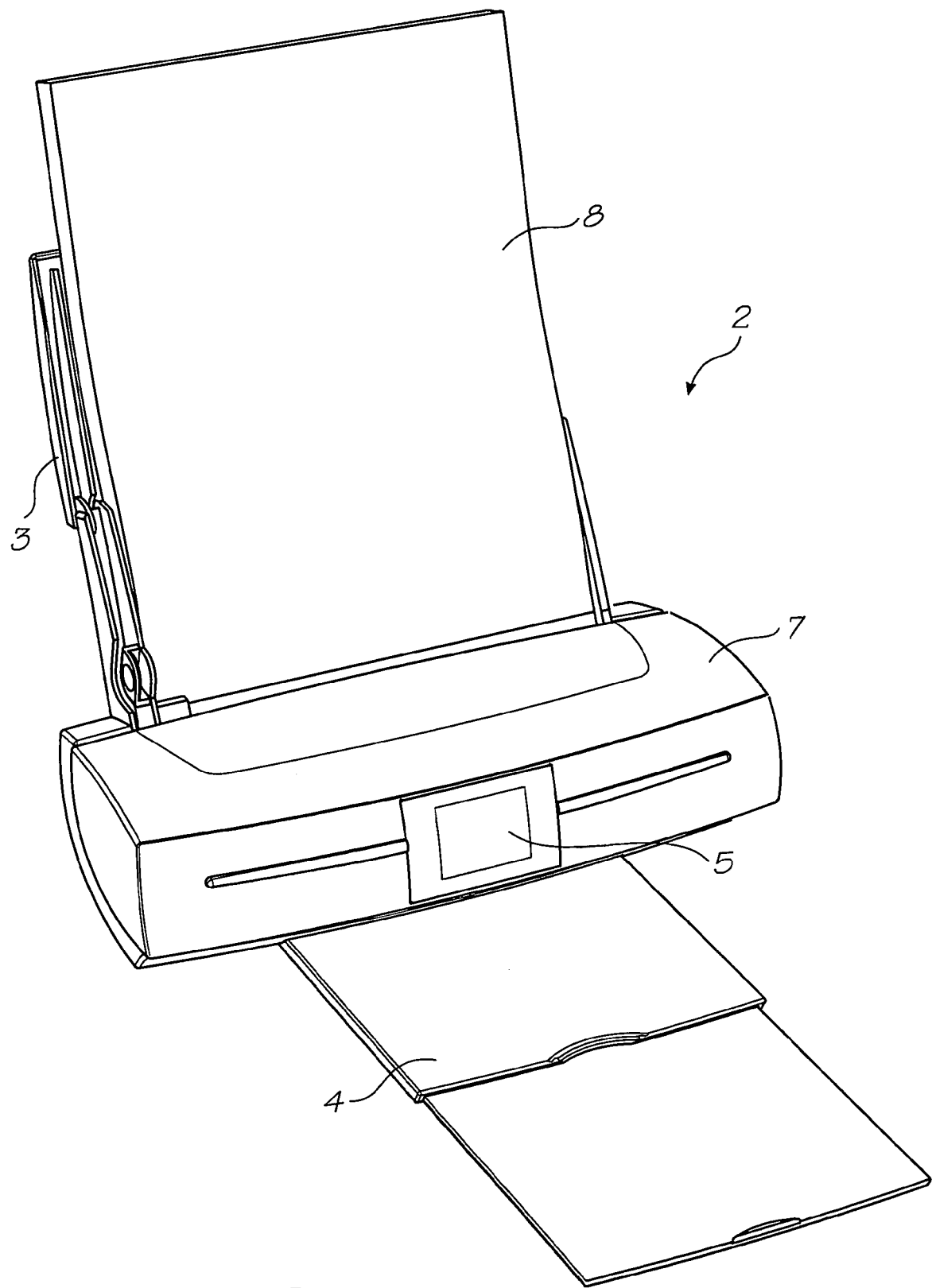
FIG. 1 is a perspective view of a printer having an embedded computer system.

FIG. 1 shows a printer 2 embodying the present invention. Media supply tray 3 supports and supplies media 8 to be printed by a print engine (concealed within a printer casing). Printed sheets of media 8 are fed from the print engine to a media output tray 4 for collection. User interface 5 is an LCD touch screen and enables a user to control the operation of the printer 2. The printer 2 comprises an embedded computer system (not shown), which controls the overall operation of the printer.

Figure 2:
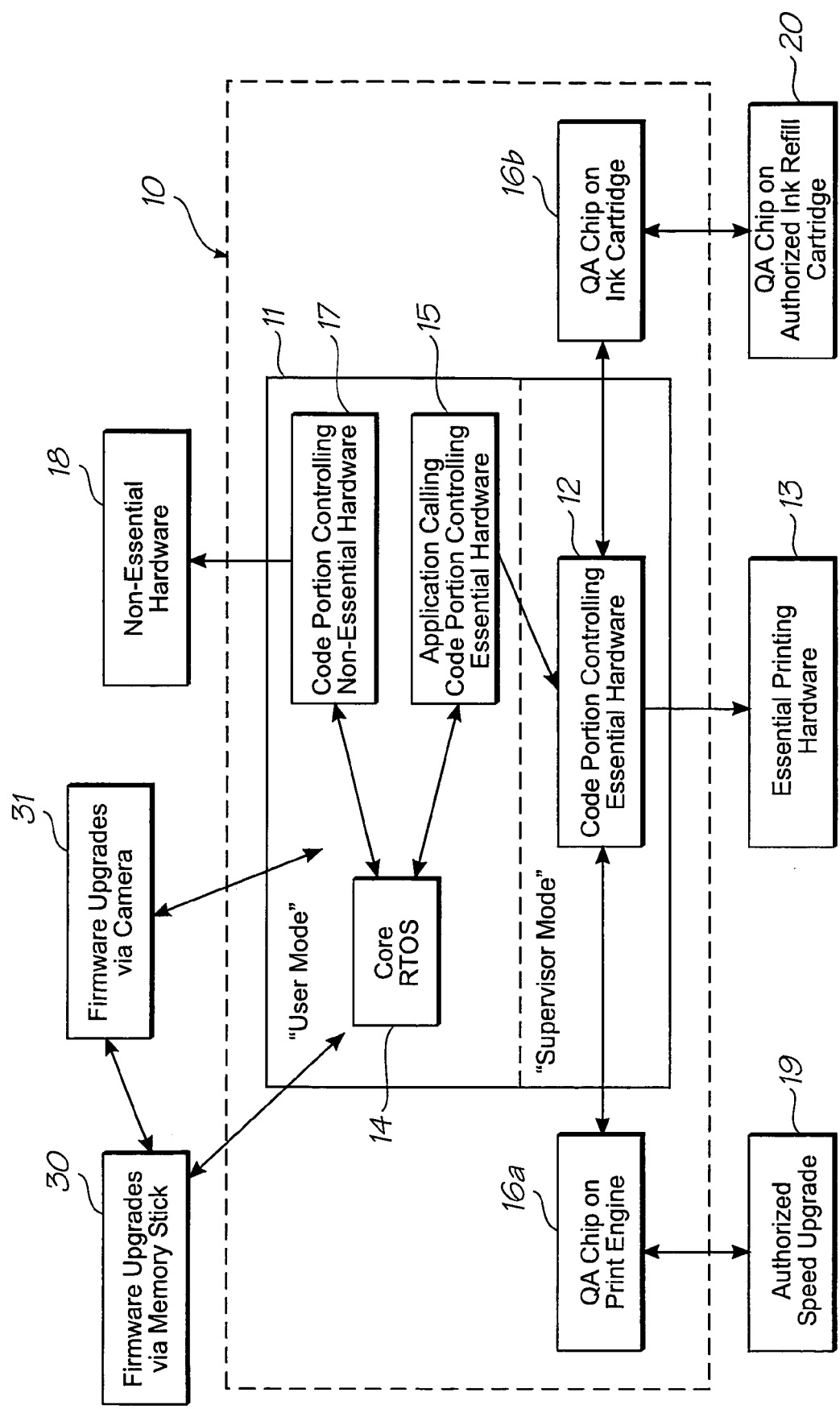
FIG. 2 is a diagram showing the interrelationship between various components of the embedded computer system and printer hardware.

Turning to FIG. 2, there is shown schematically the embedded computer system 10 and its interrelationship with printer hardware and other external components. The embedded computer system 10 comprises a processor 11, which supports user and supervisor modes. The processor 11 runs code portions 12 controlling essential printing hardware 13 in supervisor mode only. The essential printing hardware 13 may comprise drive circuitry for actuating nozzle actuators, motors driving a feed mechanism etc. All other code is run in user mode, including the core RTOS 14.

Applications 15 running in user mode control printer operations indirectly via traps which call up code portions 12. In this way, the integrity of the code portions 12 is protected, whilst still allowing some flexibility on exactly how the printer is operated.

The code portions 12 are in communication with a print engine QA chip 16a and one or more ink cartridge QA chips 16b in the printer. Before any operation of essential printing hardware 13, the code portions 12 communicate with the QA chips 16a and 16b to request authorization for that operation.

The print engine QA chip 16a is programmed with an authorized print speed (e.g. 30 pages per minute). This information is returned to the code portions 12 and the essential printing hardware 13 is operated in accordance with the authorized print speed.

The ink cartridge QA chip 16b is programmed with information regarding the ink, including an amount of remaining ink. If, for example, the ink cartridge QA chip 16b returns information that no ink is remaining in the cartridge, then the code portions 12 are not authorized to operate the essential printing hardware 13 and printing is aborted.

Since the code portions 12 are run in supervisor mode only, it is not possible for an unauthorized person to modify these code portions and, hence, it is not possible to change the operation of essential printing hardware 13 or override the security provided by the QA chips 16a and 16b.

On the other hand, code portions 17 controlling non-essential hardware 18, such as the LCD display 5, are run in user mode. These code portions 17, together with the core RTOS 14, can be modified without any authorization privileges, to provide flexibility in operation of non-essential hardware and even flexibility in selecting a desired operating system.

With the embedded system 10 arranged as described above, all printer upgrades and ink refills can be reliably controlled via the QA chips 16a and 16b. The print engine QA chip 16a may receive a print speed upgrade 19 via an authorized internet download or memory stick. Likewise, an ink refill QA chip 20 may communicate with the ink cartridge QA chip 16b during an authorized ink refill, so that the ink cartridge QA chip 16b knows a refill from an authentic source has taken place. Authorized ink refill operations are described in detail in our earlier U.S. patent application Ser. No. 11/014, 769 (filed on Dec. 12, 2004), the contents of which is hereby incorporated by reference.

Firmware Upgrades

As described above, the majority of firmware in the embedded system 10 for printer 2 may be modified or upgraded without compromising the security of licensed printer operations. Some firmware upgrades may be provided by the user.

Referring to FIG. 2, a firmware upgrade may be provided by a memory stick 30 or a camera 31. The memory stick 30 or camera 31 contains the firmware upgrade in its memory and automatically downloads the upgrade to the embedded system 10 if it detects that the embedded system requires upgrading.

In the case of the memory stick 30, the user simply plugs the memory stick into a USB port of a PictBridge printer.

In the case of the camera 31, the user simply connects the camera to a Pictbridge printer via its USB port in the normal way. The user may even be unaware that a firmware upgrade has taken place if the camera was purchased with the upgrade contained in its memory. Alternatively, the memory stick 30 may be used to download a firmware upgrade into the camera's memory, and the camera 31 used to upgrade firmware in the embedded system 10 when the camera is next connected to the printer 2.

Invalid Window Mask Configuration for User and Supervisor Codes

Further security is provided by protecting all supervisor code from user code. This removes the possibility of user code reading sensitive data and having the computer system execute arbitrary code in supervisor mode, which could allow unauthorized access to, and modification of, the operational hardware and software of the printer.

The processor 11 implements a register window architecture to manipulate data. For example, the processor is a LEON CPU implementing SPARC™ architecture. In the processor 11, the Integer Unit working registers ('r' registers), the Multiply/Divide register (Y register), the Program Counters (PC and nPC) and the hardware watchpoints are accessible to user code. Accordingly, these registers must not hold sensitive data across transitions between supervisor and user modes, in either direction.

The 'r' registers of the print engine have eight global 32-bit registers and eight sets of registers with sixteen 32-bit registers in each set. The register sets are arranged such that the processor 11 has a window that sees 24 of the registers. The current window being viewed is determined by a pointer to that window, such as a Current Window Pointer (CWP). It is to be understood that the above number of registers and register sets are merely exemplary, and a different number of registers and registers sets may be used. For example, SPARC® architecture allows a configurable number of register sets from two to 32.

With only eight windows, function calls and traps beyond this depth will cause the register window to overflow, which is handled by using a combination of an invalid window mask and overflow and underflow traps. The invalid window mask may, for example, be the Windows Invalid Mask (WIM) used in SPARC™ architecture. Overflow and underflow handlers are used to give the illusion of an unbounded number of register windows.

Conventionally, an invalid window mask contains one bit per window and overflow and underflow traps are generated when an instruction is issued to move to a new window which has its bit set, designating it as invalid.

For example, when a save instruction is issued to move the current window from window N to window N−1, the processor first checks bit N−1 of the invalid window mask. If that bit is set, the window is invalid, such that the processor does not change windows but generates a window overflow trap. Similarly, when a restore instruction is issued to move the current window from window N to window N+1, the processor first checks bit N+1 of the invalid window mask. If that bit is set, the window is invalid, such that the processor does not change windows but generates a window underflow trap.

Because the mask is ignored when a trap, such as an interrupt, occurs, rotating the window regardless, it is conventional to reserve one window as invalid so as to ensure that used registers are not overwritten when a tap occurs. Accordingly, the invalid window mask conventionally has a value with one bit set, which marks the end of the available windows. i.e., seven in the present embodiment, and reserves one window for a trap.

When an overflow trap is taken, e.g., as a result of a save instruction rotating the current window to a reserved window, the trap handler saves the oldest window to memory, rotates the invalid mask to now point to that saved window, and thereby frees up the previously reserved window for use. The reverse occurs when an underflow trap is taken, e.g., as a result of a restore instruction rotating the current window to a reserved window.

Each register set has 16 registers, comprising eight "in" registers and eight "local" registers. However, the window sees 24 registers, the remaining registers being eight "out" registers. Thus, as the window cycles through the sets, the processor 11 sees some registers from the adjacent set. This is illustrated in FIG. 3, where the "out" registers correspond to the "in" registers of the next lowest window. Thus, a given window can modify the "out" registers of the next highest window and the "in" registers of the next lowest window, even upon overflow and underflow.

Accordingly, unless appropriate measures are taken a user mode window is able to read and modify some of the data in adjacent windows including supervisor mode windows. It may even be possible for the user code to cycle through the register windows, reading and modifying the values. This is illustrated in FIG. 4, in which a switch from supervisor mode to user mode is shown. As can be seen, the supervisor code had been using windows 7 and 6 before calling the user code, however there is nothing stopping the user code from issuing multiple instructions to move back and read/modify the supervisor data.

Potentially this can lead to examples such as, if a supervisor code's registers are stored in user accessible memory, the user code easily overwriting those values thereby adjusting the values the supervisor code sees when registers are restored, or even if the supervisor code's registers are stored in supervisor-only accessible memory, the user code modifying the "out" register values and potentially fooling the code into restoring the registers from the wrong location.

In the present embodiment, these potential security threats to the supervisor code, and therefore sensitive data, are minimized by providing a system implemented by the processor 11 which configures the invalid window mask to set at least one additional bit. This designates an invalid window(s) beyond the conventional reserved window which causes additional overflow and underflow traps to be generated, namely at transitions between supervisor and user modes.

To facilitate these additional traps, separate stacks are used for supervisor code data and user code data. When transitions occur, the current stack pointer, e.g., % o6, is switched between the supervisor and user stacks. The supervisor stack is stored in supervisor mode-only accessible memory and the user stack is stored in user mode accessible or user mode-only accessible memory.

The setting of the additional bit provides a transition window between supervisor and user windows which ensures that sensitive data stored in the supervisor registers is not accessible to user code. This is illustrated in FIG. 5 where, before calling user code, the supervisor code moved down an extra two windows and marked the intermediate window invalid in the invalid window mask. This window represents a barrier at the transition because if the user code issues multiple instructions to move back through the windows, it will generate a trap when it hits the invalid window at window 5.

The location of the transition window (there may be more than one) is maintained as overflows and underflows occur. This is done by either storing information on the transition window(s) in the supervisor stack as traps occur, or storing this same information in a separate window stack, which is maintained in supervisor mode-only accessible memory. In this way, information about the transition windows is not stored in the invalid window mask or in the registers of the transition window itself. Accordingly, this information cannot be accessed by user code, thereby protecting the supervisor code data stored in the "out" or "in" registers of the transition window.

The possibility of an overflow occurring whenever supervisor mode is entered is checked so as to prevent overflow of the supervisor stack and therefore prevent overwriting of other supervisor code data. Such overflows may occur as a result of the user installing a function to be called by a trap which issues that same trap, thereby potentially causing large nesting, or a function to be called on a timer tick which takes longer than the tick's period to execute, thereby inducing continual nesting of interrupts.

Further protection of supervisor code data is needed when the reserved window is rotated on top of a supervisor window due to a call function and user code issues a trap to call supervisor code, for example. This protection is effected by configuring the traps to overwrite with 0 (e.g., with % g0) all "in" and "local" registers in the new reserved window after saving the registers to memory for the former situation, and by configuring the traps to overwrite all used register windows before returning for the latter situation.

With respect to overwriting all used register windows, a common piece of code that returns from traps can be employed, where the code overwrites all register windows from (and including) the current window down to (but not including) the reserved window (which has already been overwritten). Alternatively, code which overwrites the number of windows known to be used or known to contain supervisor code data can be used.

Because the user code calls the supervisor mode by way of a trap, the associated trap routine is configured to remember the return addresses from the trap. It may also remember the previous processor state register (PSR) when SPARC™ architecture is employed. This is done in the "local" registers of the new register window allocated for the trap routine. Given this, there will never be two adjacent transition windows, i.e., every transition window will be preceded by at least one supervisor window, namely the window used to hold the return addresses from the trap.

An exemplary system of maintaining a stack of overflow and transition windows, executed in either hardware or firmware, is now described with respect to the processor 11 employing SPARC™ architecture (a similar system is also applicable to underflows):

1. Each thread has an associated stack for storing information about transition windows.

2. Whenever supervisor code wants to call user code, it issues a call instruction to a function ('callUserFunction'), which takes the following arguments:

(i) The address of the function to be called, in % o0.

(ii) The current user (NOT supervisor) stack pointer in % o1, where the caller must arrange to pass a correct user stack pointer:

where an interrupt routine calls a user function, the trap routine could either use the user stack pointer read from the current thread context or a separate, dedicated user stack for the interrupt is used. In the latter case, context-switch calls are disabled during these calls because it is not possible to context-switch between threads if they share a common stack;

where a non-interrupt trap routine calls a user function, that trap routine would use the user stack pointer read from the current thread context.

(iii) Up to four parameters to be passed to the user function, in % o2 to % o5. % o6 contains the current frame pointer (on the supervisor stack), which must be maintained because it is where the previous supervisor window will be saved if an overflow occurs. Accordingly, callUserFunction is configured to:

issue a save, which brings the CWP to the transition window. It also means the function arguments are in the "in" registers, where the transition window's % i7 contains the address of the call instruction that called callUserFunction (because the call instruction put it there);

copy the "in" registers that contain arguments to the "out" registers, which includes the function to be called and the user stack pointer;

mark the current window (being the transition window) as invalid in the WIM.

save the % y register and the global registers into the "local" and "in" registers in this transition window;

issue another save, e.g., "save % i1, −104, % o6", which moves the current window beyond the transition window, meaning the arguments copied above are now in the "in" registers;

overwrite all register windows from the current window down to (but not including) the reserved window (which has already been overwritten). However, when overwriting the current window, those "in" registers used for arguments are not overwritten;

overwrite the % y register and the global registers, which protects any old supervisor data;

switch to user mode;

copy the required user-function arguments from % i2 to % i5 to % o0 to % o3;

call the user function;

after the user function returns, copy the current window's % o0 to % i0, which is the return value from the user function and is now in the transition window's % o0; and having copied % o0, issue a restore, which should hit the WIM's invalid bit set for the transition window, meaning the underflow trap routine should take over. The code after the restore instruction should not be executed because the restore should have caused a trap. If the code is to be executed it means the user code doesn't match all save instructions with restore instructions. This is due to a bug or malicious attack. Thus, the processor 11 is halted until reset or the code is branched back to the restore instruction, continually unwinding the register window until the expected trap is encountered.

3. The window overflow trap routine determines if the window to be saved to memory is already marked as invalid in the WIM:

If it is not marked invalid, it means it's a normal window. The trap routine therefore saves the window's registers to memory as normal, and pushes a "normal" record onto the window stack, after checking for stack overflow (as described above). This record only needs to be a single flag indicating that this is a "normal" record.

If it is marked invalid, it means it's a transition window. In this case, there is no need for the trap routine to save any registers to memory. However, it pushes a "transition" record onto the window stack. This record must include:
a flag indicating that this is a "transition" record; and
the transition window's frame pointer, i.e. % i6, the return address from callUserFunction which is read from transition window's % i7 and the % y register and global register values saved in the transition window. The % i6, % i7, % y and global registers must be saved on the window stack because they are not necessarily maintained in the transition window after the transition window is saved. After doing these saves, the transition window's registers must be overwritten (as described above).

4. The window underflow trap routine does the following:

Looks at the WIM to see if more than one bit is set. If more than one bit is set, it means that the window just encountered is a transition window. This is because the reserved window is always the first invalid window in the downward direction, such that encountering a different invalid window in the upward direction can only mean that that window is a transition window. In this case, the trap routine is configured to:
mark the transition window as valid in the WIM;
copy the transition window's % o0 to % i0, which is the return value from the user function;
restore the % y and global registers from the transition window's local registers;
move the current window pointer to the window prior to the transition window. If this hits another invalid window, that window must be the reserved window because consecutive transition windows are not possible, as described earlier. In this case, that invalid window is restored from memory, and its associated normal record is popped from the window stack; and
jump to the supervisor code that first called callUserFunction, the address of which is available via the current window's % o7 (i.e., the transition window's % i7 because, in this case, the transition window hasn't been overwritten by an overflow).

If the WIM only has one bit set, it is the reserved window that has been struck, so the trap must pop a record from the window stack. That record will indicate whether or not the window to be restored is a transition window. If it is not a transition window, the trap routine simply restores that window from memory, adjusting the CWP, and shuffling the reserved window bit appropriately in the WIM. If it is a transition window, the trap routine is configured to:
restore the transition window's % i6 and % i7, and the % y and global registers from the transition record popped from the stack;
copy the transition window's % o0 to % i0, which is the return value from the user function;
move the current window pointer to the window prior to the transition window, shuffling the reserved window bit appropriately in the WIM. This brings the CWP to the supervisor window before the transition window, meaning the values written to the "in" registers above are now in the "out" registers. Note that this window will still be in memory at this time; it also needs to be restored;
pop the next record from the window stack, which is the "normal" record corresponding to the saved supervisor window;
restore that saved supervisor window, which restores the "in" and "local" registers. The values in the "out" registers (the return value etc from above) won't be overwritten; and
jump to the supervisor code that first called callUserFunction, the address of which is available via the restored supervisor window's % o7.

In the above example, the window stack is used to record flags related to the type of window being stored, i.e., a "transition" record for a transition window and a "normal" record for a non-transition window. In this way, the position of the transition window(s) is maintained throughout overflows and underflows, and the transitions between supervisor and user modes do not result in sensitive data being accessible to user code. This is further ensured by the overwriting of all register windows before returning from traps.

Alternatively, or additionally, each used register window is labeled and the % o6 value is stored on register overflow to be used for the corresponding restore. In this way, on occurrence of overflows and underflows it is known whether a register window belongs to user mode or supervisor mode, upon checking and validation of the % o6 value.

The labels are allocated, for example, as unique numerical labels for every possible register window for a thread of execution, starting from zero and increasing monotonically for every save and/or function. The labels are used similar to the flag records described above by keeping a record of where the labels are as overflows and underflows occur.

That is, a record may be kept of the current label assigned to the reserved window, and the reserved window's window number. This is updated whenever the overflow and underflow routines shift the reserved window, where an overflow increments the label and an underflow decrements the label.

For example, at thread initialization the reserved window's label is set to eight, and its window number to zero. This record could be kept in some thread-specific supervisor RAM or it could be held in the "local" registers of the reserved window (which is inaccessible to user code). In this case, the underflow and overflow traps shift the value as they shift the reserved window. The label (L) of the current window can then be calculated as L=reserved window label−((CWP−reserved window number); bit-wise ANDed with N−1, N being the number of register windows).

The labels can also be used to access an additional state for each register window at overflow and underflow events. The additional state contains the saved stack pointer, e.g., % o6, for the window and the mode of the window. The mode identifies whether the window is executing in supervisor mode, and can additionally identify whether the window is executing in an interrupt and mode change. Similar to the flag records described above, this provides records on whether a register window belongs to user mode or supervisor mode. In this case, the label for the current window can be calculated as L=next label to save+((CWP+next label to save)^(N−1); bitwise ANDed with N−1, N being the number of register windows), where the 'next label to save' variable contains the label for the next register window to overflow, which assists in the orderly handling of overflows and underflows.

The additional state information is accessed by indexing a record of the stack pointer and mode in the window stack when overflows and underflows occur as part of the label record. This can be done for the reserved window only, as described above, or for all of the register windows. In this way, restores across transitions between user and supervisor modes can be identified and handled differently than restores which remain in user mode, for example in the manner described above. Thereby, protecting the supervisor mode sensitive data from user code access.

It will, of course, be appreciated that the present invention has been described purely by way of example and that modifications of detail may be made within the scope of the invention, which is defined by the accompanying claims.

The invention claimed is:

1. A system for protecting supervisor mode data from user code, the system comprising a processor which implements a register window architecture supporting supervisor and user modes, the processor being configured to implement the architecture as separate window stacks for the supervisor and user modes with a transition window in one of the window stacks set with at least one invalid window bit in an invalid window mask of the architecture additional to an invalid window bit set for a reserved window of the invalid window mask for transitioning from the supervisor mode to the user mode,
    wherein the supervisor mode window stack is stored in supervisor mode-only and user mode accessible memory and the user mode window stack is stored in user mode accessible memory, and
    a unique numerical label is assigned to each register window starting from 0 and increasing monotonically for every save.

2. A system according to claim 1, wherein the processor is incorporated in a print engine for a printer.

3. A system according to claim 1, wherein the position of the additional invalid window bit in the invalid window mask is maintained independent of window overflows and underflows at the transition window.

4. A system according to claim 1, wherein:
    a current stack pointer is switched to the supervisor mode window stack whenever a transition from user mode to supervisor mode occurs; and
    the current stack pointer is switched to the user mode window stack whenever a transition from supervisor mode to user mode occurs.

5. A system according to claim 1, wherein information on the transition window is recorded in the supervisor stack upon window overflow and underflow at the transition window.

6. A system according to claim 1, wherein information on the transition window is recorded in the supervisor mode window stack upon window overflow and underflow at the transition window.

7. A system according to claim 6, wherein information on non-transition windows is recorded in the supervisor mode window stack upon window overflow and underflow at the non-transition windows.

8. A system according to claim 1, wherein a record of a current label assigned to the reserved window is held in the local registers of the reserved window, the record being updated as window overflows and underflows occur at the reserved window.

9. A system according to claim 1, wherein the labels are used to index a record of at least the stack pointer of the reserved window in the supervisor mode window stack upon window overflow and underflow at the reserved window.

10. A system according to claim 9, wherein the labels are used to index a record of the stack pointers of each window in the supervisor mode window stack upon window overflow and underflow at each window.

11. A system according to claim 1, wherein the labels are calculated based on a current window pointer.

12. A system according to claim 11, wherein, when transitioning from supervisor code to user code, a call function issues saves to bring the current window pointer to the user window positioned after the transition window and overwrites the registers in at least the windows containing supervisor code data from a current window to the reserved window.

13. A system according to claim 12, wherein the call function overwrites the registers in all of the windows from the current window to the reserved window.

14. A system according to claim 13, wherein the call function overwrites all registers of the processor containing supervisor code data.

15. A system according to claim 1, wherein the registers in the transition window are overwritten upon window overflow and underflow at the transition window.

* * * * *